United States Patent
Behnken et al.

(10) Patent No.: US 9,380,053 B1
(45) Date of Patent: *Jun. 28, 2016

(54) USING RESOURCE RECORDS FOR DIGITAL CERTIFICATE VALIDATION

(71) Applicant: International Business Machines Corporation, Armonk, NY (US)

(72) Inventors: John F. Behnken, Hurley, NY (US); Yaser K. Doleh, North Royalton, OH (US); Mauro Marzorati, Lutz, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/973,803

(22) Filed: Dec. 18, 2015

Related U.S. Application Data

(63) Continuation of application No. 14/788,841, filed on Jul. 1, 2015.

(51) Int. Cl.
*H04L 29/06* (2006.01)

(52) U.S. Cl.
CPC .......... *H04L 63/0823* (2013.01); *H04L 63/123* (2013.01)

(58) Field of Classification Search
CPC . H04L 63/0823; H04L 9/3247; H04L 9/3268; H04L 9/3263; H04L 63/12; H04L 61/1511; H04L 29/12066; H04L 63/123
See application file for complete search history.

(56) References Cited

U.S. PATENT DOCUMENTS

| | | | |
|---|---|---|---|
| 6,986,049 B2 | 1/2006 | Delany | |
| 8,327,128 B1 * | 12/2012 | Prince | H04L 63/0823 713/150 |
| 8,392,980 B1 | 3/2013 | Ahrens et al. | |
| 8,832,283 B1 | 9/2014 | Roskind et al. | |
| 9,065,820 B2 | 6/2015 | Leggette et al. | |
| 2005/0114367 A1 * | 5/2005 | Serebrennikov | G06F 17/30887 |
| 2011/0010553 A1 * | 1/2011 | Cahn | H04L 63/0823 713/175 |
| 2012/0124369 A1 * | 5/2012 | Amenedo | H04L 63/0823 713/156 |
| 2012/0174208 A1 * | 7/2012 | Sperling | H04L 63/0823 726/10 |
| 2013/0132717 A1 * | 5/2013 | Brand | H04L 9/0825 713/156 |
| 2013/0346743 A1 * | 12/2013 | Dixon | H04L 9/3247 713/156 |

(Continued)

FOREIGN PATENT DOCUMENTS

WO    WO 2014/117600    *  8/2014    .............. H04L 29/06

OTHER PUBLICATIONS

R. Rosenbaum :Using the Domain Name System to store arbiitrary string attributes, RFC 1464, Network Working Group, 1993, 4 pages.*

(Continued)

*Primary Examiner* — Catherine Thiaw
(74) *Attorney, Agent, or Firm* — Diana L. Roberts; Nicholas D. Bowman

(57) ABSTRACT

A digital certificate incorporated within a communication is received from a server associated with a host name. Resource records associated with the host name are caused to be queried for a list of certificate authorities. In response to causing the resource records to be queried, the list of certificate authorities is received. A certificate authority is identified within the received digital certificate. The identified certificate authority is compared to the received list of certificate authorities. A determination is made, based on the comparison, that the identified certificate authority is included in the received list of certificate authorities.

1 Claim, 6 Drawing Sheets

(56) References Cited

U.S. PATENT DOCUMENTS

| | | | |
|---|---|---|---|
| 2014/0013105 A1 | 1/2014 | Niemeyer | |
| 2014/0101442 A1 | 4/2014 | Pao et al. | |
| 2014/0325079 A1 | 10/2014 | Savolainen et al. | |
| 2014/0325623 A1 | 10/2014 | Johansson | |
| 2014/0331287 A1* | 11/2014 | Barr | H04L 9/3268 726/4 |
| 2015/0121067 A1 | 4/2015 | Dixon et al. | |
| 2015/0341446 A1* | 11/2015 | Nguyen | H04L 67/16 709/223 |

OTHER PUBLICATIONS

Chelshire et al. "DNS-based service discovery", RFC 6763, IETF, 2013, 46 pages.*

D. Eastlake and O. Gudmundsson, "Storing certificates in the Domain Name System (DNS", RFC 2538, 1999, 20 pages, Network Working Group.*

Laurie et al., "RFC 6962—Certificate Transparency," https://tools.ietf.org/html/rfc6962#section-1, ISSN: 2070-1721, Jun. 2013 (printed Mar. 26, 2015 1:17 PM), 28 pgs.

Unknown, "Certificate Transparency," http://www.certificate-transparency.org (printed Mar. 26, 2015 1:18 PM), 2 pgs.

Unknown, "Security Now! Transcript of Episode #481," https://www.grc.com/sn/sn-481.html (last edited Nov. 12, 2014, 20:01; printed Mar. 26, 2015 1:11 PM), 27 pgs.

Unknown, "Security Now 481," http://twit.tv/show/security-now/481, Nov. 11, 2014 (printed Mar. 26, 2015 1:16 PM), 2 pgs.

Unknown, Wikipedia, "Online Certificate Status Protocol," https://en.wikipedia.org/wiki/Online_Certificate_Status_Protocol, (last modified Apr. 22, 2015 at 11:23, printed Jun. 24, 2015), 4 pgs.

Unknown, Wikipedia, "Revocation List," https://en.wikipedia.org/wiki/Revocation_list (last modified May 7, 2015 at 8:24, printed Jun. 24, 2015), 4 pgs.

Unknown, Wikipedia, "Sender Policy Framework," https://en.wikipedia.org/wiki/Sender_Policy_Framework (last modified Jun. 7, 2015 at 07:00, printed Jun. 24, 2015), 11 pgs.

Behnken et al., "Using Resource Records for Digital Certificate Validation", U.S. Appl. No. 14/788,841, filed Jul. 1, 2015.

List of IBM Patents or Patent Applications Treated as Related, Feb. 9, 2016, 2 pages.

* cited by examiner

USING RESOURCE RECORDS FOR DIGITAL CERTIFICATE VALIDATION

BACKGROUND

The present disclosure relates to digital certificates and, more specifically, to using resource records for digital certificate validation.

Digital certificates (e.g., X.509 Certificates) are often an important aspect of digital security. Digital certificates are issued to entities by Certificate Authorities (CAs). These CAs are responsible for verifying that parties requesting digital certificates are who they claim to be. Upon issuance, a digital certificate will typically include, among other things, the name of the issuing CA, the common name (CN) of the owner of the certificate (e.g., the party to whom the certificate is issued), and a modulus. The modulus is a string of characters that acts as the operative portion of the certificate and is unique to a given certificate.

SUMMARY

According to embodiments of the present disclosure, aspects of the disclosure may include a method, a system, and a computer program product. A digital certificate incorporated within a communication is received from a server associated with a host name. Resource records associated with the host name are caused to be queried for a list of certificate authorities. In response to causing the resource records to be queried, the list of certificate authorities is received. A certificate authority is identified within the received digital certificate. The identified certificate authority is compared to the received list of certificate authorities. A determination is made, based on the comparison, that the identified certificate authority is included in the received list of certificate authorities.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

Figure 1:
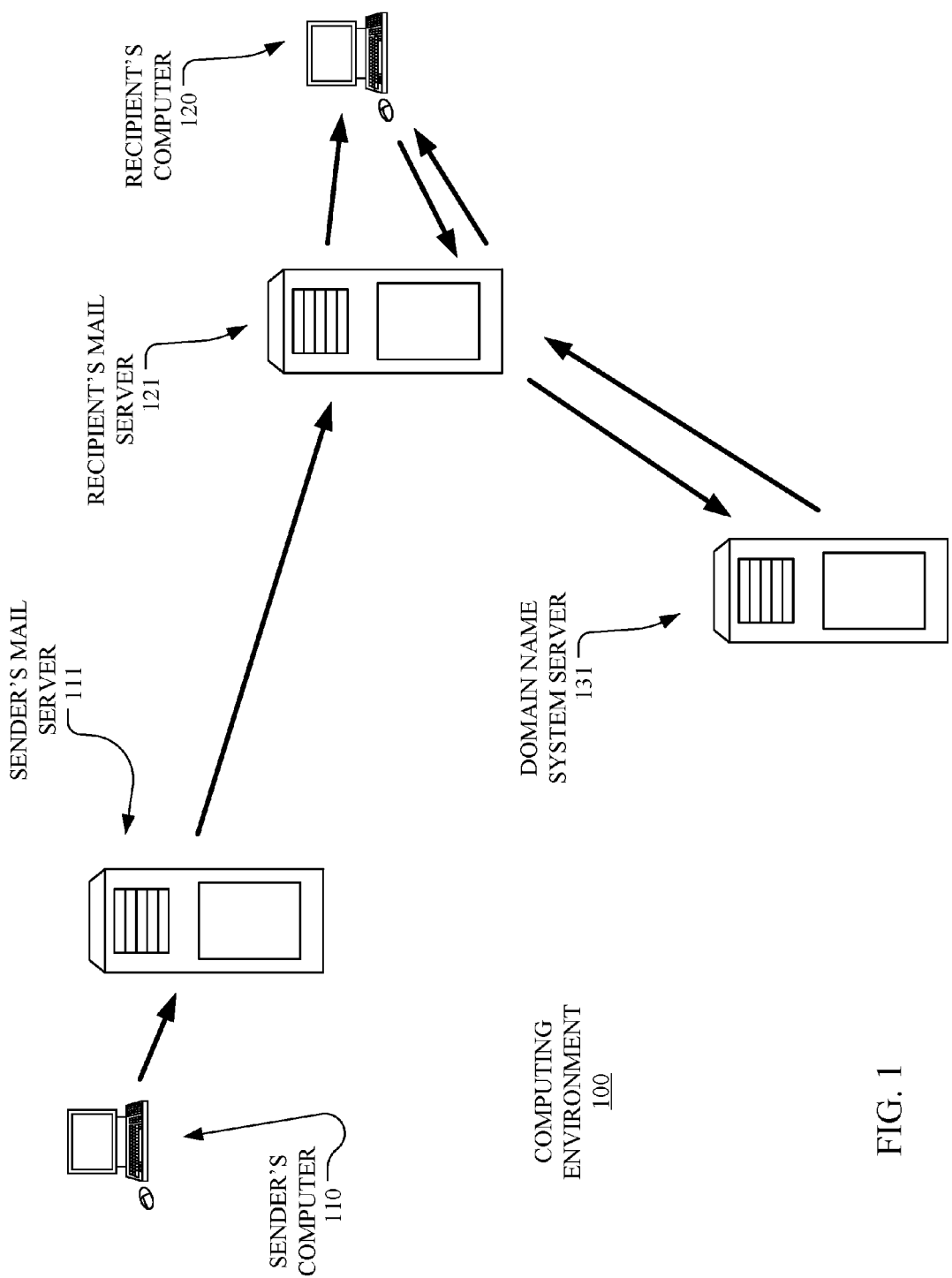
FIG. 1 illustrates a block diagram of an example computing environment used in digital certificate validation in the context of an email exchange, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to digital certificates and, more specifically, to using resource records for digital certificate validation. While the present disclosure is not necessarily limited to such applications, various aspects of the disclosure may be appreciated through a discussion of various examples using this context.

One of the assumptions that underlies and upholds a system that relies on digital certificates is that Certificate Authorities (CAs) are implicitly trusted third parties that are virtually unimpeachable sources of authority. This may be an acceptable assumption in many circumstances but, in other situations, may also lead to problems. For example, if the owner of a digital certificate has his digital certificate compromised (e.g., by a stolen private key), there may not be an acceptable way for him to efficiently inform the public that the digital certificate has been compromised and should no longer be trusted. This may mean that the public will continue to misplace their trust in the compromised digital certificate because they rely too heavily on the trustworthiness of the CA that issued it. Furthermore, in some situations, CAs themselves are not perfect. They can issue certificates improperly or be subject to cyberattacks that can render them unreliable.

While there may be certain mechanisms to provide public notice of revoked certificates (e.g., via certificate revocation lists), these mechanisms may themselves be flawed. Furthermore, in some situations, certificate owners may want to discourage others from trusting even valid digital certificates. This may occur, for example, when a certificate owner decides that he no longer trusts a particular CA, so he wants to disavow any of his own certificates issued by that CA. Or a certificate owner may want to limit the number CAs (or number of certificates for that matter) that he trusts to only one or two and disavow certificates issued by any other CAs.

In some embodiments of the present disclosure, an individual may use resource records associated with his network domain to create an approved list (e.g., whitelist) of certificates and/or CAs. More particularly, certificate validity information may be included in Domain Name System (DNS) resource records associated with a host name. By publishing information associated with a particular certificate (e.g., the certificate's modulus, the common name (CN) of the certificate owner, the issuing CA, etc.) in resource records, the certificate owner may be able to effectively assert to the world the genuine nature of that certificate (or the trustworthiness of a particular CA) to the detriment of all others.

In some embodiments, resource records may be used for digital certificate validation in the context of email exchanges. Further, in some embodiments, this validation may occur in the context of web browsing.

Referring now to the figures, shown in FIG. 1 is a block diagram of an example computing environment 100 used in digital certificate validation in the context of an email exchange, in accordance with embodiments of the present disclosure. In some embodiments, the computing environment 100 may include computing devices 110, 111, 120, 121, and 131 in communication with each other over one or more networks. The networks may be implemented by any number of any suitable remote or local communications media (e.g., wide area network (WAN), local area network (LAN), Internet, Intranet, hardwire, wireless link). In some embodiments, the computing environment 100 may be implemented within a cloud computing environment, or using one or more cloud computing services. Consistent with various embodiments, a cloud computing environment may include a network-based, distributed data processing system that provides one or more cloud computing services. Further, the cloud computing environment may include any number of computers (e.g., hundreds or thousands of them or more), disposed within one or more data centers and configured to share resources over the one or more networks.

Email messages may be exchanged within the computing environment 100. For example, an email message may be transmitted from the sender's computer 110 to the recipient's computer 120. The transmission of the example email message may begin with a first user (e.g., a human sender at the sender's computer 110) generating an email message for a second user (e.g., a human recipient at the recipient's computer 120). The email message may be generated and transmitted from the sender's computer 110, via the sender's mail user agent (MUA), to the sender's mail server 111. In some embodiments, the sender's mail server 111 may be a host server for the sender's domain. Next, the sender's mail server 111 may forward the email message, for example via the Internet, to the recipient's mail server 121 (e.g., a host server for the recipient's domain). From the recipient's mail server 121, the message may be passed to the recipient's computer 120 and provided to the recipient, for example, via the recipient's MUA.

In some embodiments, certain security measures may be taken, before the email message is provided to the recipient, to verify that the email message was actually sent from the sender, and not from an interloper, spammer, or other unwanted third party. Some of these security measures, as described in more detail herein, may involve checking resource records of the sender's domain. As used herein, resource records (e.g., Domain Name System (DNS) resource records) may refer to digital records that are used within the DNS to hold information associated with one or more individual domain names (e.g., host names). There are several different types of resource records and each type may hold type-specific data. For example, an A-type record is used to translate a specified domain name to its IPv4 address (e.g., IP address). These records are made generally available for review via the Internet. To check these records, a query may be initiated at the client-side by, for example, a DNS resolver on a client computer. The query is transmitted to a DNS server that may either store the requested information locally or one may need to forward the query to one or more other DNS servers (e.g., an authoritative DNS server) in order to obtain the desired information about the host name specified in the query.

As shown in FIG. 1, in response to receiving the message, a component on the recipient's computer 120 may cause the resource records on domain name server 131 to be queried for information about the host name associated with the sender's mail server 111. If the information provided in response to the query is acceptable (e.g., if the host name for the domain specified in the message matches the host name for the sender's mail server 111), then the message may be provided to the recipient. If however, the information provided in response to the query does not satisfy a set of predetermined requirements (e.g., if the host name for the domain specified in the message does not match the host name for the sender's mail server 111), then the message may be discarded, quarantined, or the like, without being provided to the recipient.

Figure 2:
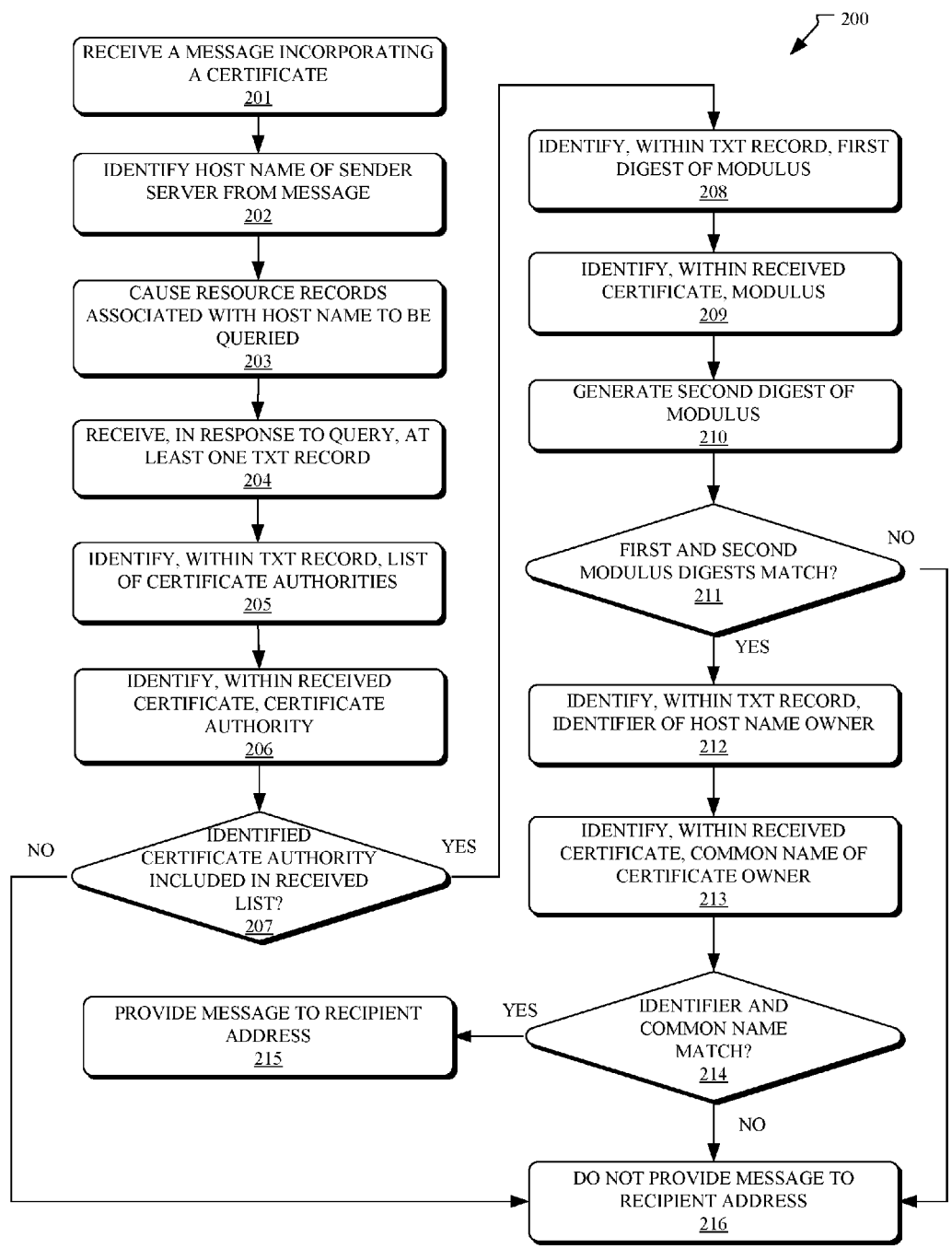
FIG. 2 illustrates a flowchart of an example method for using a Domain Name System (DNS) query to determine if an email message should be provided to a recipient, in accordance with embodiments of the present disclosure.

Referring now to FIG. 2, shown is a flowchart of an example method 200 for using a DNS query to determine if an email message should be provided to a recipient, in accordance with embodiments of the present disclosure. In some embodiments, operations of the method 200 may be performed by components of a client of an intended email message recipient or by the intended recipient's mail server or by both. The method 200 may begin at operation 201, wherein a message incorporating a digital certificate is received. Per operation 202, a host name of the server that (allegedly) sent the message is obtained. The host name may be obtained, for example, from the header of the message (e.g., from the sender's email address). Per operation 203, the resource records associated with the identified host name are caused to be queried. This query may take the form of a DNS query that is transmitted to a DNS server having a cached copy of the specified resource records.

In response to the query and per operation 204, at least one text (TXT) record associated with the queried domain may be obtained. As used herein, a TXT record may refer to a type of resource record used to associate a string of text with a specified host name. In some situations TXT records may be unformatted, which may allow for any desired type of information to be stored within them. In some embodiments, the received TXT record may contain information that is specifically included therein by the relevant domain name owner in order to facilitate email (or digital certificate) validation of the type described herein. Further, in some embodiments, this validation information may be arranged within the TXT record in an agreed upon format that is publicly known or otherwise knowable by both the domain name owner and those responsible for initiating DNS queries.

Per operation 205, a list of certificate authorities may be identified within the TXT record. In some embodiments, this list of certificate authorities may include a listing of all of the certificate authorities that the particular domain owner trusts or all of the certificate authorities from whom the domain owner has purchased digital certificates. The list may include one or more certificate authorities. The domain owner may update the TXT record periodically. For example, if a domain owner obtains a digital certificate from a particular certificate authority, then has the private key associated with that digital certificate compromised, the domain owner may respond by removing that particular certificate authority from the list of trusted certificate authorities, thereby effectively disavowing the reliability of the compromised key.

Per operation 206, the certificate authority responsible for issuing the digital certificate received with the message is identified. This may involve an automatic or manual review of the text of the digital certificate itself. Per operation 207, the identified certificate authority is compared to the received list of certificate authorities. If a determination is made that the identified certificate authority is not included in the received list, then, per operation 216 the message is not provided to the recipient's address. If, however, a determination is made that the identified certificate authority is included in the received list, then, per operation 208, further information may be identified from the TXT record. Specifically, a first digest (e.g., hash) of the modulus of the digital certificate may be identified. In some embodiments, the first digest of the certificate modulus is included in the TXT record by the domain owner as an added security measure (e.g., in addition to listing the trusted certificate authorities). The particular hashing algorithm used by the domain owner in creating the digest may be known by the message recipient beforehand or may be determinable from the TXT record itself. Examples of usable hashing algorithms may include variants of the Secure Hash Algorithm (SHA), including SHA-1, SHA-256, and SHA-512.

Per operation 209, the modulus of the digital certificate received with the email message is identified by reviewing the digital certificate. Per operation 210, a second digest of the modulus is generated. Per operation 211, the first digest (from the TXT record) and the second digest (generated from the digital certificate itself) are compared. If a determination is made that the two digests do not match, then, per operation 216 the message is not provided to the recipient's address. If, however, a determination is made that the two digests do match, then, per operation 212, further information may be identified from the TXT record. Specifically, in operation 212 an identifier corresponding to the owner of the domain is identified. The identifier may be, for example, the full name of the owner or an abbreviation of the owner's name. Per operation 213, the common name of the certificate owner is identified from the received digital certificate.

Per operation 214, the identifier and the common name are compared. If a determination is made that the identifier and common name do not match, then, per operation 216, the message is not provided to the recipient's address. If, however, a determination is made in operation 214 that the identifier and common name match, then, per operation 215, the message is provided to the recipient's address.

While an example of method 200 in use is described herein, it is contemplated that many other variants on operations of method 200 are possible. For example, in some embodiments, different, more, or fewer security measures may be used to validate a received email message. For example, in some embodiments, one or more of operations 208-214 may be eliminated. This may mean that a message may be validated by confirming that the identified certificate authority is included in a received list of certificate authorities and, if so, the message may be provided to the recipient address (per operation 215) without performing the other checks (e.g., first and second digest match, identifier and common name match). This may serve to simplify or speed up the validation process. In some embodiments, the determination as to which validation checks are to be performed on a particular digital certificate may be based on a security setting for a particular recipient's mail server. For example, higher security settings may mean that the DNS resource records need to include more pieces of validation information. If a required piece of validation information is not included, then the mail server may not be willing to provide to the message to the recipient email address. In some embodiments, the security settings mail be adjustable by the recipient.

Furthermore, in some embodiments, the determination as to which validation checks are to be performed on the received certificate may be made based on information obtained from the relevant DNS resource records. More specifically, which validation checks are performed in a particular instance may be dictated by whether or not certain records are included in the resource records. Thus, a domain owner may be able to control the number and type of security checks that are performed on digital certificates purporting to be from his host server simply by including more or less information in his resource records. For example, if the TXT record received in operation 204 is empty (e.g., because the domain owner did not decide to take advantage of the added security measures) or does not include content in the proper syntax, then the message may be provided to the recipient's address (per operation 215) without performing any of the listed validation checks. Or, for another example, if the TXT record received in operation 204 includes a list of certificate authorities and an identifier of the host name owner but does not include a first digest of the certificate modulus, the security checks may include the certificate authority matching (per operation 207) and the host name owner matching (per operation 214), but not the digest matching of operation 211.

Furthermore, in some embodiments, there may be other ways for a domain owner to control the number and type of security checks that are performed on digital certificates purporting to be from his host server. For example, the received TXT record may be structured such that the recipient's mail server is able to determine the domain owner's desired certificate validation checks by reading the TXT record with reference to some previously agreed upon syntax (e.g., the SPF policy extension described herein).

Furthermore, in some embodiments, the components performing the method 200 may not actually receive a TXT record as specified in operation 204. Instead, in some embodiments, the desired information (e.g., list of certificate authorities, first digest of modulus, identifier of domain name owner) may be obtained from the TXT records by a third party acting on behalf of the components performing method 200, without the need for the components to obtain this information from the TXT records directly.

Furthermore, in some embodiments, the method 200 may involve using one or more extensions on the Sender Policy Framework (SPF). The SPF protocol is a commonly available mechanism for mail exchangers to detect email spoofing. This mechanism may allow a receiving mail exchanger to check that incoming email messages from a domain are actually being sent by a host specifically authorized (e.g., by a domain administrator) to send email messages on behalf of that domain. The mechanism may work by placing a listing of authorized sending hosts for a domain in the DNS resource records for that domain in a specifically formatted TXT record.

In some embodiments, in addition to the mechanisms or syntax that are commonly included within the SPF protocol (ALL, A, IP4, IP6, etc.), additional mechanisms are added to facilitate certificate validation. Specifically, added mechanisms may include a mechanism for holding a modulus (or modulus digest) for a certificate that the domain administrator desires to assert as genuine. In addition, added mechanisms may include a mechanism for holding the list of CAs that are trusted by the domain owner and are therefore designated as potential signers for the entire domain. An example of a set of relevant resource records for an example domain of "acme.com" is provided in the following Table 1:

TABLE 1

| Record 1 | acme.com | IN | A | 127.0.0.1 |
|---|---|---|---|---|
| Record 2 | acme.com | IN | MX | inboundmail1.acme.com |
| Record 3 | acme.com | IN | TXT | "v=spf1 mx a:outboundmail1.acme.com a:outboundmail2.acme.com ~all" |
| Record 4 | acme.com | IN | TXT | "v=spf1 x509: 5d00598c2a325b82a9ddf4 c3e78b43d7ae5292b04a646730374e0b a8c0e06f40" |
| Record 5 | acme.com | IN | TXT | "v=spf1 ca:/C=US/O=BigCorp, Inc./CN=BigCorp SSL CA" |

In the depicted example, the first resource record is an A-type record indicating that host server for the acme.com domain has an IP address of 127.0.0.1. The second resource record is an MX-type record indicating the inbound email server for the acme.com domain. The third record is a TXT-type record indicating the outbound email servers for the acme.com domain. The fourth record indicates, according to an extension to the SPF framework, that the genuine X.509 certificate for the acme.com domain has the digest listed when digested by a designated hashing algorithm. The fifth record indicates, according to another extension of the SPF framework, the list of trusted CAs for the domain. In this example, the only trusted CA is "BigCorp".

To aid understanding, an example of some operations of method 200 as applied to the example resource records for acme.com is provided herein. In this example, the fourth and fifth resource records are obtained (per operation 204) after obtaining an email message from the acme.com domain (per operation 201). The approved list of CAs (including only BigCorp in this example) is identified from the fifth resource record (per operation 205). The approved CA is compared to the CA that issued the received digital certificate (per operation 207). In this example, the issuing CA is also BigCorp, and the match is discovered. Then the modulus is taken from the received certificate (per operation 209), hashed to generate a second digest of the modulus (per operation 210), and the digests are compared (per operation 211). In this example the digests match (e.g., both are 5d00598c2a325b82a9ddf4c3e78b43d7ae5292b04a6467303 74e0ba8c0e06f40), and after performing the host name comparison (per operation 214), the digital certificate is deemed validated and the email message from the acme.com domain is provided to the recipient (per operation 215).

Figure 3:
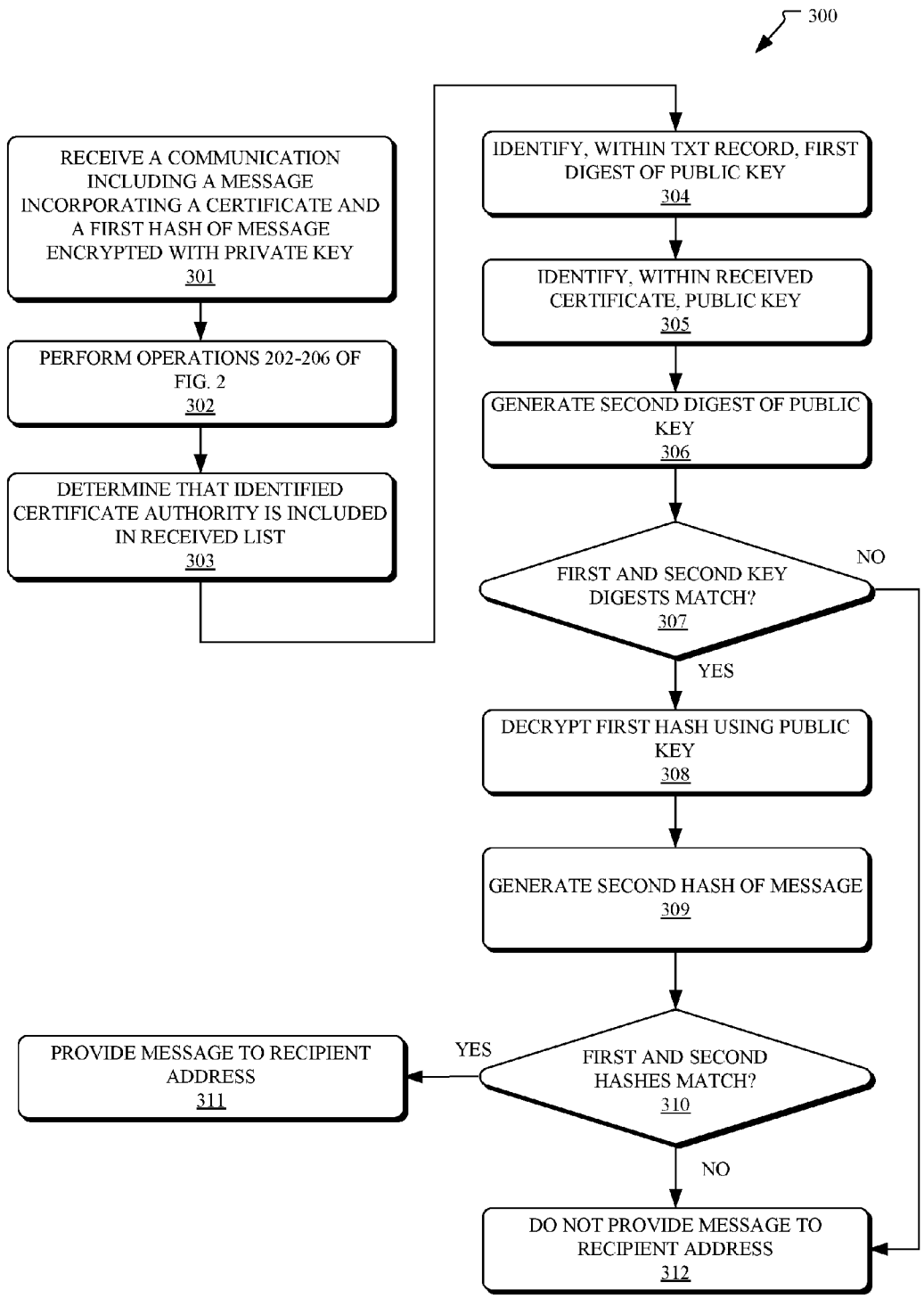
FIG. 3 illustrates a flowchart of a second example method for using a DNS query to determine if an email message should be provided to a recipient, in accordance with embodiments of the present disclosure.

Referring now to FIG. 3, shown is a flowchart of a second example method 300 for using a DNS query to determine if an email message should be provided to a recipient, in accordance with embodiments of the present disclosure. In some embodiments, operations of the method 300 may be performed by components of a client of an intended email message recipient or by the intended recipient's mail server or by both. The method 300 may begin at operation 301, wherein a communication may be received. As received the communication includes a message incorporating a digital certificate and a first hash of that message, which is encrypted with a private key.

Per operation 302, the operations 202-206 described in reference to FIG. 2 may be performed with respect to the received communication. Per operation 303, a determination may be made that the certificate authority (as identified in operation 206 of FIG. 2) is included in the list of certificate authorities (as identified in operation 205 of FIG. 2). Per operation 304, a first digest of a public key is identified within the TXT record (received in operation 204 of FIG. 2). In some embodiments, the digest of the public key is added to the TXT record by the domain owner to indicate to the public which key the domain owner uses. The digest of the public key (rather than the entire public key itself) may be included in the TXT record because the public key may be too large to fit within the TXT record.

Per operation 305, a public key corresponding to the private key used to encrypt the first hash may be identified within the received digital certificate. Per operation 306, a second digest of the public key may be generated from the copy of the public key contained within the certificate. Per operation 307, the first and second public key digests may be compared. If the keys are determined not to match, then, per operation 312, the message may not be provided to the recipient email address. If, however, a determination is made that the keys match, then, per operation 308, the validation of the email message may continue with the first hash being decrypted using the (now itself validated) public key. Per operation 309, a second hash of the message may be generated. Per operation 310, the first and second hashes may be compared. If the hashes do not match, then, per operation 312, the message may not be provided to the recipient. If, however, the hashes do match, then, per operation 311, the message may be deemed authentic and provided to the recipient email address.

Figure 4:
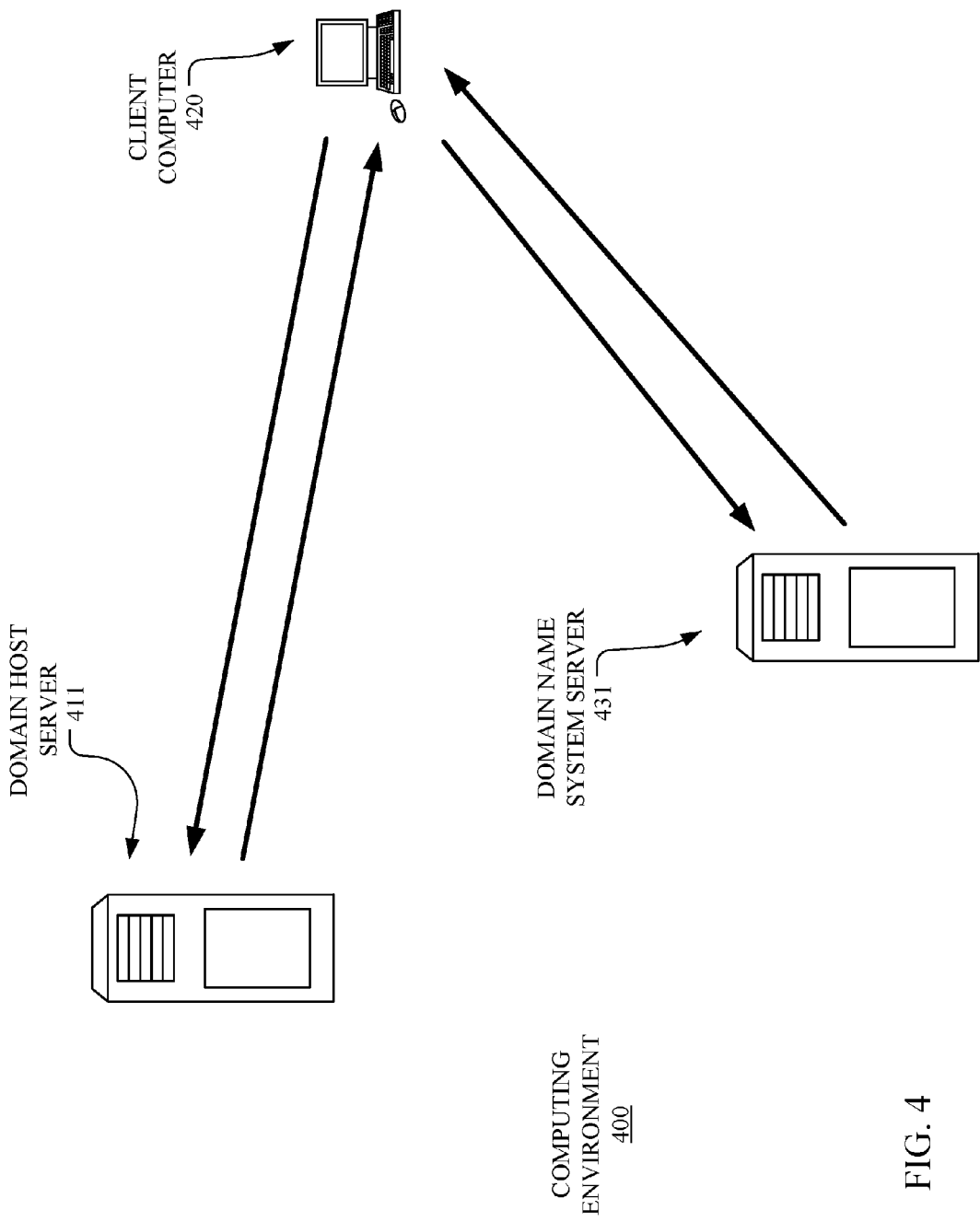
FIG. 4 illustrates a block diagram of an example computing environment used in digital certificate validation in the context of web browsing, in accordance with embodiments of the present disclosure.

Referring now to FIG. 4, shown is a block diagram of an example computing environment 400 used in digital certificate validation in the context of web browsing, in accordance with embodiments of the present disclosure. In some embodiments, the computing environment 400 may be the same or substantially similar to computing environment 100 of FIG. 1. Computing environment 400 may include computing devices 411, 420 and 431 in communication with each other over one or more networks, such as those described in reference to FIG. 1.

Web browsing may occur within the computing environment 400. For example, a user on client computer 420 may indicate a desire to browse a web page associated with a particular uniform resource locator (URL). A web browser on the client computer 420 may respond to the user indication by looking up an IP address of a server having a host name associated with the desired web page. The IP address may be found, for example, in a local cache or by querying resource records located on DNS server 431. Using the IP address, the client computer 420 may attempt to establish a secure connection with the server hosting the web page (in this instance, domain host server 411). Through a series of communications between the domain host server 411 and the client computer 420, the secure connection may be established, thereby allowing the user to view the desired web page. Examples of secure connections may include, for example, secure socket layer (SSL) and transport layer security (TLS).

In some embodiments, certain security measures may be taken, during the establishment of the secure connection, to help verify that the client computer 420 is actually communicating with the domain host server 411 and not with an unwanted third party. Some of these security measures, as described in more detail herein, may involve checking resource records associated with the relevant domain name. The resource records that are reviewed may be in addition to those that are normally reviewed in order to obtain the relevant IP address and may include, for example, the TXT records described herein.

During the establishment of the secure connection, and as part of the verification of domain host server 411, information obtained from a digital certificate sent by domain host server 411 to client computer 420 may be compared with information identified in the resource records about the domain obtained by client computer 420 from the DNS server 431. If the information from the digital certificate and the resource records match, then the secure connection may be established. If however, the information from the digital certificate and the resource records do not match, then the attempt to establish the secure connection may be abandoned by the client computer 420 and an error message may be provided to the user.

Figure 5:
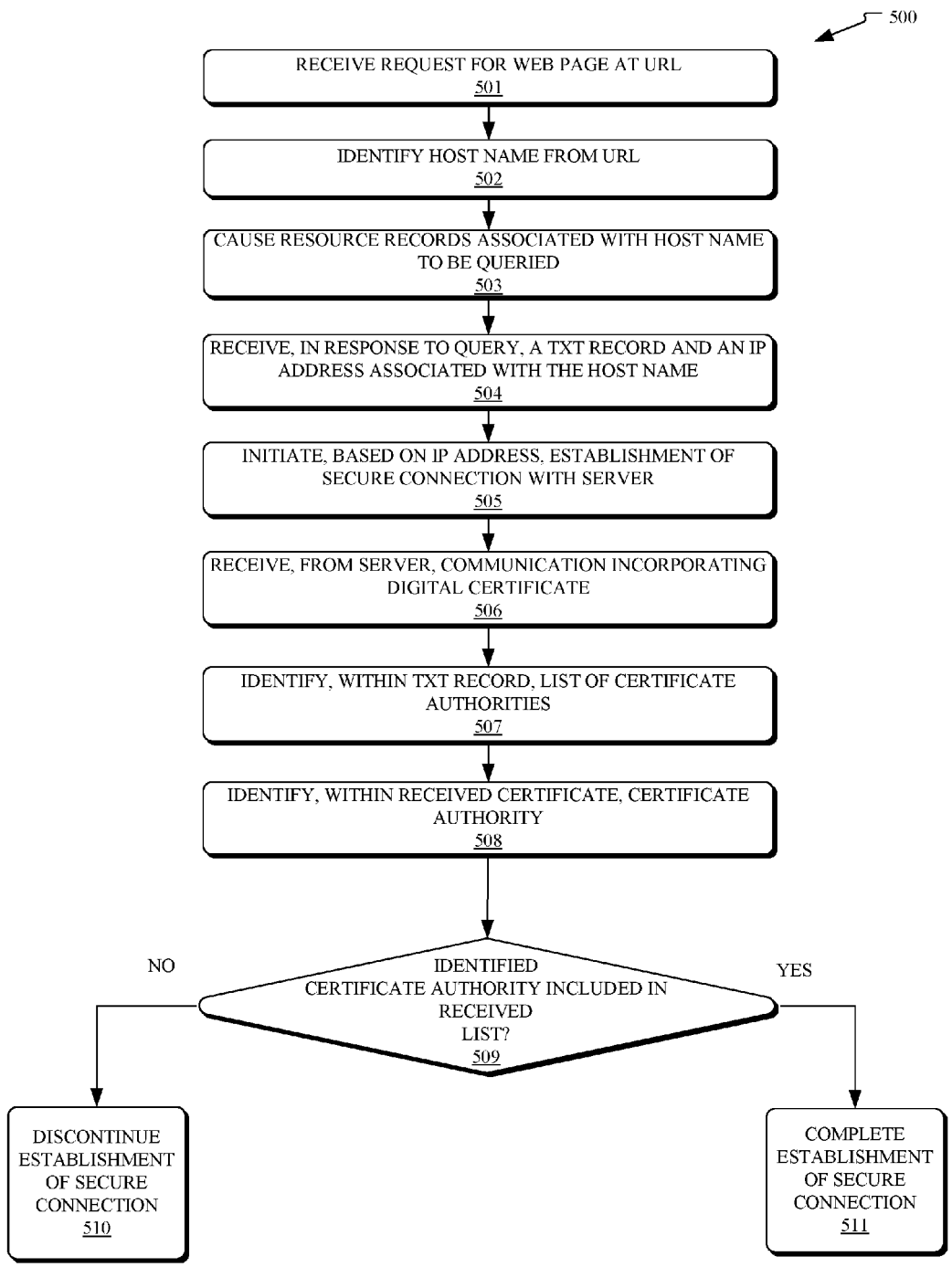
FIG. 5 illustrates a flowchart of an example method for using a DNS query to evaluate the validity of a digital certificate during establishment of a secure connection, in accordance with embodiments of the present disclosure.

Referring now to FIG. 5, shown is a flowchart of an example method 500 for using a DNS query to evaluate the validity of a digital certificate during establishment of a secure connection, in accordance with embodiments of the present disclosure. In some embodiments, operations of the method 500 may be performed by components (e.g., a web browser) of a client computer, such as client computer 420 of FIG. 4. The method 500 may begin at operation 501, wherein a request to retrieve a web page located at a URL may be received. This request may take the form of a user typing the URL into the web browser of a client. Per operation 502, a host name (e.g., domain name) may identified from the URL. Per operation 503, the resource records associated with the identified host name are caused to be queried (e.g., in the form of a DNS query). This query may include a request to a DNS resolver to resolve the host name into a corresponding IP address of the server hosting the desired web page. In response to the query and per operation 504, at least one TXT record associated with the queried domain and an IP address corresponding to the host name may be obtained.

Per operation 505, the establishment of a secure connection with the host server may be initiated based on the received IP address. In response to initiating the secure connection and per operation 506, a communication incorporating a digital certificate may be received, (allegedly) from the host server. Per operation 507, a list of certificate authorities may be identified within the TXT record. Per operation 508, the certificate authority responsible for issuing the digital certificate received with the communication is identified from the certificate itself. Per operation 509, the identified certificate authority is compared to the received list of certificate authorities. If a determination is made that the identified certificate authority is not included in the received list, then, per operation 510 the attempted establishment of the secure connection with the server may be abandoned (e.g., discontinued or terminated). If, however, a determination is made that the identified certificate authority is included in the received list, then, per operation 511, the attempt to establish the secure connection with the server may be continued and, ultimately, completed.

While an example of method 500 in use is described herein, it is contemplated that many other variants on operations of method 500 are possible. For example, in some embodiments, different, more, or fewer security measures may be used to validate the digital certificate received from the server. For example, in some embodiments, checks that are the same or substantially similar to the ones performed in operations 208-214 of FIG. 2 may be included (e.g., first and second digest match, identifier and common name match). For another example, in some embodiments, checks that are the same or substantially similar to the ones performed in operations 304-307 may be included (e.g., public key digest match).

Furthermore, in some embodiments, the method 500 may involve using one or more extensions on the Sender Policy Framework (SPF) in the same or substantially the same manner as described with reference to method 200 of FIG. 2. Or, in some embodiments, a different protocol using new mechanisms/syntax for evaluating digital certificates in the context of web browsing may be utilized. For example, a policy referred to herein as the X.509 Certificate Registry Protocol (XCRP) may be established. In some embodiments, this protocol is invoked during the name resolution portion of a socket setup procedure during establishment of a secure connection (e.g., via TLS). The invocation may begin with the requesting of TXT records associated with a target domain (e.g., per operation 503) in addition to its A or AAAA record. Upon receipt of these records, the values in the TXT record may be read and understood by a client utilizing the mechanisms and qualifiers of the XCRP policy. Upon initiating establishment of the socket and receipt of a relevant server's X.509 certificate, the certificate's modulus, common name, and/or issuer values may be validated against the policy (e.g., per operations 507-509). The disposition of the socket may be dictated by the validation results.

In some embodiments utilizing the XCRP, each DNS operator may specify the XCRP policy for each host that provides a secured connection service. This may be done with the addition of TXT records (within DNS resource records) in a manner that may be similar to the extended SPF policy described herein. An example of nine mechanisms and four qualifiers defined for an embodiment of an XCRP policy is shown in Table 2:

TABLE 2

| | |
|---|---|
| ALL | Matches always; used for a default result like - all for all CNs not matched by prior mechanisms. |
| STRICT | Matches when all conditions in the policy are met. |
| ALIAS | Matches when the value in the XCRP record contains received certificate's common name. Used for related domains, or domain names. |
| MD5 | Matches when the value in the XCRP record equals the MD5 hash of the received certificate's modulus. |
| SHA256 | Matches when the value in the XCRP record equals the SHA256 hash of the received certificate's modulus. |
| SHA384 | Matches when the value in the XCRP record equals the SHA384 hash of the received certificate's modulus. |
| SHA512 | Matches when the value in the XCRP record equals the SHA512 hash of the received certificate's modulus. |
| ISSUER | Matched when the value in the received certificate's issuer is an exact textual match with the value in the XCRP. |
| INCLUDE | Used to augment the XCRP record with the value obtained by querying the referenced value in the XCRP record. |
| "+" | For a PASS result. This can be omitted; e.g., +md5 is the same as md5. |
| ? | For a NEUTRAL result interpreted like NONE (no policy). |
| ~ | For SOFTFAIL, a debugging aid between NEUTRAL and FAIL. Typically, messages that return a SOFTFAIL are accepted but tagged. |
| "−" | For FAIL, the certificate should be rejected. |

The mechanisms and qualifiers defined in Table 2 may be used by a client to understand and utilize a TXT record (or other type of resource record) containing the XCRP policy for a particular domain. For example, a client could receive (in response to a DNS query) a record including the following information:

alphaexample.com IN TXT "v=xcrp1 issuer:C=US, O=SmallCorp, Inc., CN=SmallCorp SSL CA md5: 859260f9bf8ffa47becaed66ddcdb603-all"

Using the information in Table 2, the client could construe this record to mean that a digital certificate received during establishment of a secure connection with the domain alphaexample.com should be checked to make sure that the issuer of the certificate is "SmallCorp" and that the MD5 of the certificate's modulus is "859260f9bf8ffa47becaed66ddcdb603". Any certificate not meeting both of these requirements should be rejected.

For another example, a client could receive a different record including the following information:

alphaexample1.com IN TXT "v=xcrp1 issuer:C=US, O=MediumCorp, Inc., CN=MediumCorp SSL CA alias: www.alphaexample1.com-all"

Using the information in Table 2, the client could construe this second record to mean that a digital certificate received during establishment of a secure connection with the domain alphaexample1.com should have an issuer of "MediumCorp" and the common name on the certificate should be listed as "www.alphaexample1.com".

To aid understanding, an example scenario employing an embodiment of the XCRP policy is described herein. In this scenario, a client web browser is asked to retrieve a web page at https://www.betaexample.com/index.html. The client web browser parses the URL into its constituent parts, then requests name resolution services from the local resolver libraries for the parsed host name. Specifically, the client requests A (and/or AAAA) records and TXT records for www.betaexample.com. In response to the request, the local resolver libraries receive a set of TXT records created according to the XCRP syntax. From the received records, the client web browser constructs (e.g., identifies) the XCRP policy for the www.betaexample.com domain. The client then initiates a secure socket with the IP address included in the received A record and receives a digital certificate in response from the server associated with the IP address. The client analyzes the received certificate and attempts to validate it according to the constructed XCRP policy for the domain. This may include, for example, a common name match, a certificate authority match, and/or a modulus match. If the policy is satisfied, then the client continues the establishment of the secure socket.

Figure 6:
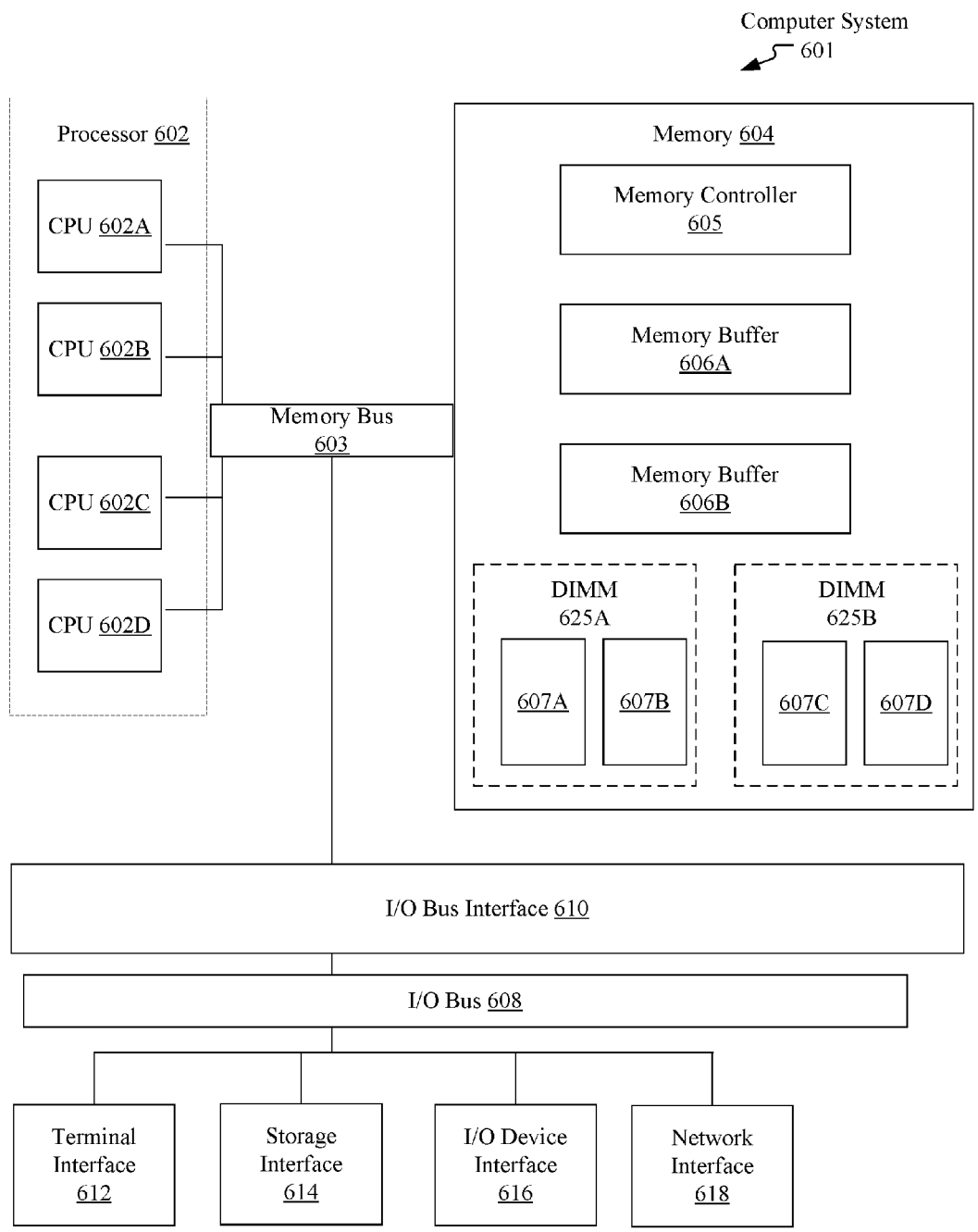
FIG. 6 illustrates a high-level block diagram of an example computer system that may be used in implementing one or more of the methods described herein, in accordance with embodiments of the present disclosure.

Referring now to FIG. 6, shown is a high-level block diagram of an example computer system (i.e., computer) 601 that may be used in implementing one or more of the methods, tools, and modules, and any related functions or operations, described herein (e.g., using one or more processor circuits or computer processors of the computer), in accordance with embodiments of the present disclosure.

In some embodiments, computer system 601 may be a client, a server, or any other computing device described herein. In some embodiments, the major components of the computer system 601 may comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may comprise one or more levels of on-board cache.

In some embodiments, the memory subsystem 604 may comprise a random-access semiconductor memory, storage device, or storage medium (either volatile or non-volatile) for storing data and programs. In some embodiments, the memory subsystem 604 may represent the entire virtual memory of the computer system 601, and may also include the virtual memory of other computer systems coupled to the computer system 601 or connected via a network. The memory subsystem 604 may be conceptually a single monolithic entity, but, in some embodiments, the memory subsystem 604 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

In some embodiments, the main memory or memory subsystem 604 may contain elements for control and flow of memory used by the CPU 602. This may include all or a portion of the following: a memory controller 605, one or more memory buffers 606A and 606B and one or more memory devices 625A and 625B. In some embodiments, the memory devices 325A and 325B may be dual in-line memory modules (DIMMs), which are a series of dynamic random-access memory (DRAM) chips 607A-607D (collectively referred to as 607) mounted on a printed circuit board and designed for use in personal computers, workstations, and servers. The use of DRAMs 607 in the illustration is exemplary only and the memory array used may vary in type as previously mentioned.

Although the memory bus 603 is shown in FIG. 6 as a single bus structure providing a direct communication path among the CPUs 602, the memory subsystem 604, and the I/O bus interface 610, the memory bus 603 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

receiving, by a client computer, a request to retrieve a web page at a uniform resource locator (URL) incorporating a host name;

causing, by the client computer and in response to the receiving the request to retrieve the web page, resource records associated with the host name to be queried for an IP address of a server associated with the host name, a list of certificate authorities, a first digest of a modulus of a digital certificate, and an identifier of an owner of the host name, wherein the IP address of the server, the list of certificate authorities, the first digest of the modulus of the digital certificate, and the identifier of the owner of the host name are stored within the resource records on a Domain Name System (DNS) server;

receiving, by the client computer, from the DNS server, and in response to the causing the resource records to be queried, the IP address of the server, the list of certificate authorities, the first digest of the modulus of the digital certificate, and the identifier of the owner of the host name;

initiating, by the client computer and based on the received IP address, establishment of a secure connection with the server;

receiving, by the client computer, from the server and in response to the initiating the establishment of the secure connection, the digital certificate incorporated within a communication;

identifying, by the client computer and within the received digital certificate, a certificate authority, the modulus, and a common name of an owner of the digital certificate;

comparing, by the client computer, the identified certificate authority to the received list of certificate authorities;

determining, by the client computer and based on the comparing the identified certificate authority to the received list of certificate authorities, that the identified certificate authority is included in the received list of certificate authorities;

generating, by the client computer, a second digest of the modulus;

comparing, by the client computer, the first digest of the modulus and the second digest of the modulus;

determining, by the client computer and based on the comparing the first digest and the second digest, that the first digest and the second digest match;

comparing, by the client computer, the identifier of the owner of the host name and the common name of the owner of the digital certificate;

determining, by the client computer and based on the comparing the identifier of the owner of the host name and the common name of the owner of the digital certificate, that the owner of the host name and the owner of the digital certificate match;

completing, by the client computer and in response to the determining that the identified certificate authority is included in the received list of certificate authorities, that the first digest and the second digest match, and that the owner of the host name and the owner of the digital certificate match, the establishment of the secure connection with the server; and retrieving the web page.

* * * * *